(12) United States Patent
Blanchard

(10) Patent No.: US 7,486,729 B2
(45) Date of Patent: *Feb. 3, 2009

(54) VIDEO SIGNAL ANALYSIS AND STORAGE

(75) Inventor: Simon Blanchard, Taipei (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 1465 days.

This patent is subject to a terminal disclaimer.

(21) Appl. No.: 10/144,816

(22) Filed: Oct. 25, 2001

(65) Prior Publication Data

US 2002/0126758 A1    Sep. 12, 2002

Related U.S. Application Data

(63) Continuation of application No. 09/039,598, filed on Mar. 16, 1998, now Pat. No. 6,347,114.

(30) Foreign Application Priority Data

Mar. 22, 1997    (GB)    ................................. 9705999.2

(51) Int. Cl.
*H04N 7/12*    (2006.01)

(52) U.S. Cl. .............. 375/240.01; 375/240; 375/240.12

(58) Field of Classification Search ................. 375/240, 375/240.01, 240.12; 386/53; 725/22
See application file for complete search history.

(56) References Cited

U.S. PATENT DOCUMENTS 4,390,904 A * 6/1983 Johnston et al. ............... 386/53
4,789,235 A   12/1988 Borah et al. ................. 351/246
4,920,423 A   4/1990 Shiota ......................... 358/335
5,436,653 A   7/1995 Ellis et al. ..................... 725/22
5,612,729 A * 3/1997 Ellis et al. ..................... 725/22
5,835,667 A   11/1998 Wactlar et al. ................. 386/96

FOREIGN PATENT DOCUMENTS

| EP | 0685968 A2 | 6/1995 |
| JP | 6134764 A | 2/1986 |
| WO | WO9322875 | 11/1993 |
| WO | WO9411995 | 5/1994 |
| WO | WO9416442 | 7/1994 |

* cited by examiner

*Primary Examiner*—Allen Wong

(57) ABSTRACT

A video recording and logging device includes apparatus to detect scene changes (as distinct from shot cuts or edit points) in audio/video signals. The apparatus includes a filtering arrangement which receives and filters the audio soundtrack accompanying the video signal to periodically determine a background audio signal level. A scene change is indicated when the current background audio level differs from a previous background level by more than a predetermined amount. A short cut or edit point presented near the indicated scene change is identified as the scene change. Preferably changes in background noise distant from shot cuts and edit points are ignored. A table of scene change locations may then be built up and stored with the video and audio data. An editing facility presents scene changes as the first picture in the scene and allows scene change identifications to be added, deleted or labeled by a human editor.

11 Claims, 2 Drawing Sheets

VIDEO SIGNAL ANALYSIS AND STORAGE

CROSS REFERENCE TO RELATED APPLICATIONS

This is a continuation of application Ser. No. 09/039,598, filed Mar. 16, 1998 now U.S. Pat. No. 6,347,114.

The present invention relates to a method and apparatus for use in processing and recording audio plus video (herein AV) data streams and in particular, although not exclusively, to the automated detection and logging of scene changes.

A distinction is drawn here between what has been referred to by the terms scene change or scene cut in some prior publications and the meaning of these terms as used herein. In these prior publications, scene changes (also variously referred to as edit points and shot cuts) has been used to refer to any discontinuity in the video stream arising from editing of the video or change in camera shot during a scene: where appropriate such instances are referred to herein as shot changes or shot cuts. As used herein, scene changes (or scene cuts) are those points accompanied by a change of context in the displayed material. For example, a scene may show two actors talking, with repeated shot changes between two cameras focused on the respective actors' faces and perhaps one or more additional cameras giving wider or different angled shots. A scene change only occurs when there is a change in the action location or time. Systems for detecting shot cuts by comparison of the contents of successive video fields or frames are known in the fields of video printers (U.S. Pat. No. 4,920,423—which refers to the breaks as "scene transitions") and format conversion systems (EP-A 0 685 968—edit point detection and correction to avoid mismatches in field combination).

An example of a further use for discontinuity detection, in video tape logging, is described in International patent application WO94/11995 of Dubner et al. The apparatus comprises a videotape recorder for recording both video data and the accompanying audio soundtrack, together with a data processing system coupled to simultaneously receive the video and arranged to generate an index of detected cut points by capturing video frames from those cut points and storing them separately from the video tape, for example on the hard disc of a personal computer hosting the system. The Dubner system is described as particularly suited for logging video signals from surveillance cameras, particularly those liable to record long sequences of images of generally uninhabited areas. Once again, comparison of pixel values from successive frames is used to identify "break" points of potential interest, although in this instance it is changes in scene content which are flagged (for example instances of sudden movement occurring within the field of vision). To simplify the data handling requirements, comparison is only made between small portions of successive frames, with a numerical value being derived for changes between portions in successive frames and a value exceeding a predetermined threshold being taken as indicative of a shot cut or notable change in scene content.

In various described embodiments, the Dubner system provides an on-screen display formed from a number of reduced scale versions of grabbed frames, with facilities provided for scrolling through all or a selection of these frames. Means are provided for annotating selected frames, in addition to the time stamp indicating the location of the original frame of the video tape, by typing in comments to be recalled when that frame is next selected. A further annotation technique provides a graphic representation of the audio waveform accompanying a sequence of captured frames, on which waveform representation the user can place markers to indicate additional cut points to be recorded by the system.

Whilst the Dubner system provides a number of useful features for the monitoring and editing of video streams, it is unable to distinguish between scene cuts and shot cuts, treating both alike. We have recognised that there is a desire for such a distinguishing system and in particular one which may be employed in domestic video recording equipment in addition to more complex video editing and recording suites.

It is accordingly an object of the present invention to provide means for detection of scene changes in a video stream and operable to distinguish them from shot cuts.

It is a further object to provide video recording means capable of detecting and identifying scene changes in a recorded video stream.

In accordance with a first aspect of the present invention there is provided a method for detecting video scene changes in a video signal with accompanying audio soundtrack, the method comprising the steps of:

filtering the audio soundtrack to periodically determine a background audio signal level;

comparing current and previously determined background audio signal levels to identify discontinuities in background level; and flagging, as the first frame of a new video scene, a video signal frame commencing at or shortly after the background audio discontinuity.

By detecting discontinuities in audio in background levels, scene changes may generally be identified and distinguished from mere shot changes where the background audio level will generally remain fairly constant.

The invention also provides video scene change detection apparatus comprising an input for a video signal with accompanying audio soundtrack, and means for detecting scene changes in the video signal received via said input; characterised in that the means for detecting scene changes comprises a filtering arrangement coupled to receive and filter said audio soundtrack to periodically determine a background audio signal level, first storage means arranged to maintain a record of the last determined background level, and comparator means arranged to flag a scene change when the current background level differs from the stored last background level by more than a predetermined amount.

In order to introduce a tolerance for miscalculation of individual background level values the first storage means may be arranged to maintain a record of the last N determined background levels, where N is a value of two or more, with the apparatus further comprising averaging means coupled with the first storage means and arranged to generate an average background audio signal level from said last N determined background levels. With this averaging of previously calculated levels, the comparator means may then be arranged to flag a scene change when the current background level differs from the determined average background level by more than the said predetermined amount.

The detection apparatus may further include means operable to identify individual frames in the video signal and arranged to flag those meeting predetermined criteria relative to detected discontinuities in the audio background level as scene change frames: where the video data is encoded according to MPEG standards, this predetermined criteria might suitably be that a scene change frame is the first I-frame detected following a discontinuity in audio background level.

In accordance with a further aspect of the present invention there is provided video recording apparatus comprising scene change detection apparatus as recited above, together with recording means operable to record received audio and video signals on a removable record carrier.

In such a video recorder, processor means may be provided coupled with the scene change detection apparatus and recording means, with such a processor being operable to generate a list of the scene change frames and their respective recorded locations on the record carrier. Preferably, the processor would be further operable to store the list of scene change frame locations on the record carrier.

The above-mentioned video recording apparatus may be further operable to play back audio and video signals from a record carrier. In such a case, the apparatus may be arranged to identify whether the record carrier contains a list of scene change frames and, if so, to identify one or more scene change frames under user control and present the or each said frame, via display means, to the user. In order to accomplish such presentation, the apparatus may further comprise image data processing means arranged to extract from the record carrier, reduce in size, and display in a predetermined arrangement, a sequence of scene change frames as a static menu screen. In order to enhance the functionality of such a menu screen arrangement, the apparatus may further comprise user-operable input means (for example mouse or joystick controller) by which a user may select one from a plurality of scene change frames on the menu screen, with the apparatus being arranged to play back stored video from the record carrier commencing from the selected scene change frame.

Still further in accordance with the present invention there is provided a record carrier having audio and video data and a list of scene change frames recorded thereon by apparatus as described above. In a preferred embodiment, to take account of the faster access times possible in comparison with video tape, the record carrier would be an optical disc according to DVD-RAM or equivalent standards.

Further features and advantages will now be described, by way of example only, with reference to the accompanying drawings in which.

Figure 1:
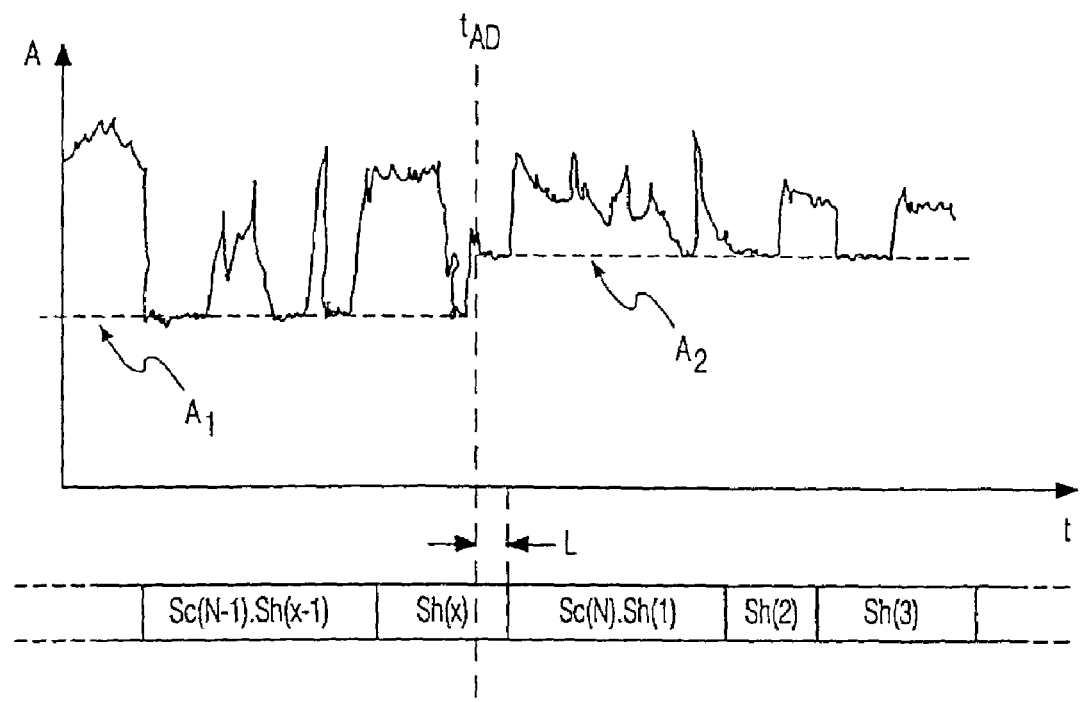
FIG. 1 represents the relationship between audio signal levels, video shot cuts and video scene changes.

Referring initially to FIG. 1, this schematically represents the underlying principle of the present invention, namely the use of detection of changes in background audio levels to detect scene changes, as opposed to shot cuts. The upper part of the Figure is a graph of amplitude against time for the audio signal component. The lower part of the Figure represents the accompanying video sequence, showing the last few shots (Sh(x−1); Sh(x)) of one scene (Sc(N−1)) followed by the first few shots (Sh(1); Sh(2); Sh(3)) of the following scene (Sc(N)). As shown, the portion of the audio signal to the left of the Figure, despite superimposed peaks due to actors speaking or other audio features of the narrative, has an underlying audio amplitude $A_1$, whereas the portion of audio to the right of the Figure has an underlying (background) amplitude $A_2$ with the moment of transition between these levels being generally indicated by the line $t_{AD}$.

It will be noted that there is a slight time lag L following the transition of background audio level from $A_1$ to $A_2$ before the start of the video component of the new scene Sc(N). This is a feature generally to be found in prerecorded audio/video presentations, with the start of scene Sc(N) generally only coinciding with $t_{AD}$ in interactive applications where scenes (with their audio accompaniment) are stored separately and joined on the fly. In order to precisely determine the start of scene Sc(N), having determined $t_{AD}$, differing techniques may be used. Where the video is a mixture of individually encoded and differentially coded frames such as the well known arrangement of I, P and B frames according to MPEG standards, the first frame of the succeeding scene may suitably be taken as the first individually coded frame (I-frame) encountered after $t_{AD}$. In addition to giving a high likelihood of successful selection, this choice also simplifies the extraction for display as will be described hereinafter.

An alternative, although more expensive, technique for precisely determining the start of scene Sc(N) is to use the technique of background audio level detection in combination with traditional shot cut detection techniques based around comparison of pixel data from successive frames. Whilst all shot changes would be detected, only those coincident with or immediately following the detected change in background audio level would be classed as scene changes and logged.

Figure 2:
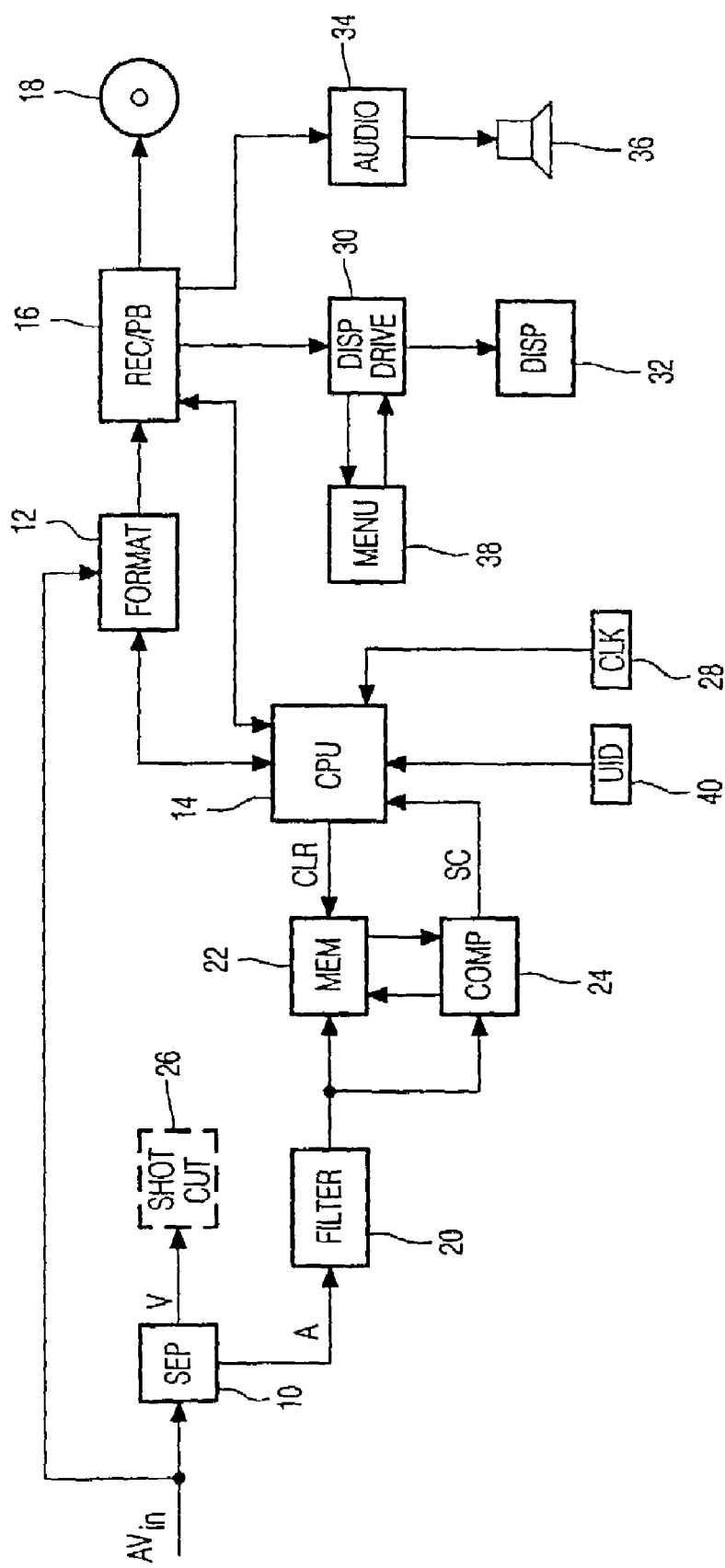
FIG. 2 is a block schematic diagram of an audio/video recording and playback apparatus embodying the present invention.

Turning now to FIG. 2, a block schematic diagram of an audio/video recording and playback system embodying the invention is presented. From a source of audio/video data $AV_{IN}$, which might for example be the output from a videotape player or television broadcast receiver, the signal is passed to a first stage 10 which separates the audio and video components. The input audio/video data $AV_{IN}$ is also passed to a formatting stage 12 which, under control of a central processing unit CPU 14, handles any signal processing or format organisation necessitated by the form in which it is to be stored. In the embodiment shown, the formatted data from stage 12 is passed to a recording/playback stage 16 which records it on a high density optical disc 18. The use of a high density optical disc as the storage means is preferred for, amongst others, reasons of speed of access as will become apparent.

The separated audio component from input stage 10 is passed to a filtering stage 20 which periodically samples (or constantly monitors) the amplitude of the audio waveform and, at regular intervals, outputs a derived value for the background audio amplitude level to memory 22 which holds a number of preceding derived background levels. Each instantaneously derived audio background level is also passed to a comparator stage 24, coupled with the memory 22. The comparator stage 24 compares the latest derived background amplitude level against preceding values from memory 22 and, in the event of a substantial difference (for example of a magnitude exceeding a predetermined threshold value) the comparator indicates a scene change SC to the CPU 14. In order to avoid false results subsequently, the CPU 14 sends a clear signal CLR to the memory 22 resulting in the deletion of all but the last stored background amplitude value.

Having received the scene change SC signal from the comparator 24, the CPU 14 identifies the likely first video frame of the new scene (as described previously) via formatting stage 12 and, through control of the disc record/playback stage 16, identifies the storage location of this frame on disc 18. As previously mentioned, the identification of the first video frame of the new scene may optionally be made by use of frame content comparison means, indicated in dashed outlines at 26 and coupled to receive the separated video component from input stage 10.

As the video signal is received in real time, the CPU 14 builds up a table of the scene change frames and their locations on disc 18; which table is suitably also recorded on the disc 18 at the conclusion of the input video. A system clock 28 coupled with CPU 14 may optionally also be used to monitor elapsed time for the input video signal and generate time stamps for inclusion in the table of scene change frame data for subsequent presentation as additional information to a user.

Playback of data from the disc is again controlled by CPU 14 through the record/playback stage 16. Coupled to receive the video and audio data read from the disc are respectively a display driver 30 outputting signals to display 32, and an audio amplification stage 34 outputting the audio signals to one or more speakers 36. Under control of the CPU 14, and by reference to data stored in a local memory 38, the display driver 30 is enabled to generate a menu screen on display 32 by means of which the captured scene change frames (and optional time stamps) may be presented to the user as an index to the contents of the disc 18.

Figure 3:
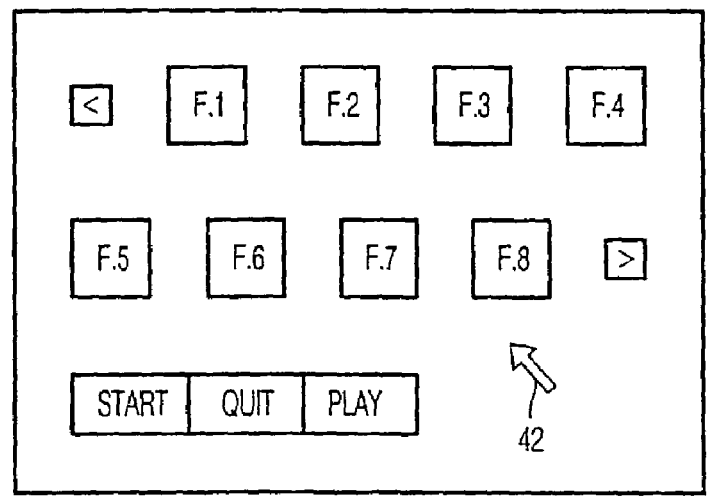
FIG. 3 represents an on-screen menu display generated by the apparatus of FIG. 2.

Such a menu screen is shown in FIG. 3 and comprises eight sequentially captured scene change frames F1 to F8 read from the disc 18 by reference to the previously generated and stored table, the frames being reduced in size and displayed as shown. In a preferred arrangement, the apparatus includes a user operable input device 40 (FIG. 2) such as a mouse or joystick which, through the CPU, enables the user to move a cursor 42 about the display screen. In addition to the displayed images F1 to F8 and cursor 42, the display screen may include a number of user operable buttons actuated by selecting with the cursor and user input device 40 or possibly just by positioning the cursor over the button. Functions associated with these buttons preferably include means for scrolling through the captured scene change frames, in forward and reverse directions, since many more than the eight shown are likely to be captured. Other possible functions include instructions to return to the start of the sequence of captured frames, an instruction to quit the menu screen (i.e return to normal playback operation) and an instruction to play the stored video starting at a selected one of the displayed scene change frames.

In connection with this latter feature, a utility which may be provided would allow swift review of a scene contents by replaying a selected sequence of frames following a scene change frame on selection of that scene change frame from the menu. This may be accomplished in the relatively simple fashion, for example by simply playing the I frames (where the recorded data is in MPEG format) which frames might suitably be displayed in reduced form in the location of their scene change frame on the menu screen. These miniaturised versions of scenes might simply be actuated by positioning the cursor 42 over the desired one of the displayed scene change frames.

To summarise, an apparatus for detecting scene changes (as distinct from shot cuts or edit points) in audio/video signals is disclosed, together with video recording and logging apparatus employing such detection. The means for detecting scene changes comprises a filtering arrangement which receives and filters the audio soundtrack accompanying the video signal to periodically determine a background audio signal level. By comparison of current and previously determined background levels, a scene change is flagged when the current background level differs from a previous background level by more than a predetermined amount. A table of scene change locations may then be built up and stored with the video and audio data.

From reading the present disclosure, other modifications will be apparent to persons skilled in the art. Such modifications may involve other features which are already known in the field of video signal recording and processing instruments and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. Video scene change detection apparatus comprising:
an input for a video signal with accompanying audio soundtrack;
means for detecting scene changes in the video signal received via the input, and including:
filtering means to receive and filter the audio soundtrack for periodically determining a current background audio signal level;
first storage means for maintaining a record of the last determined background audio signal level; and
comparator means for flagging a scene change when the current background level differs from the stored last background level by mere than a predetermined amount.

2. The apparatus as claimed in claim 1, wherein:
the first storage means maintain a record of the last N determined background levels, where N is a value of two or more;
the apparatus further comprising averaging means coupled with the first storage means for generating an average background audio signal level from the last N determined background levels; and
the comparator means flag a scene change when the current background level differs from the determined average background level by more than the predetermined amount.

3. The apparatus as claimed in claim 1 further comprising means for identifying individual frames in the video signal for flagging those frames that meet a predetermined criteria relative to detected discontinuities in the audio background level as scene change frames.

4. The apparatus as claimed in claim 3, wherein the video data includes data encoded according to MPEG standards and the predetermined criteria includes that a scene change frame is the first I-frame presented following a discontinuity in audio background level.

5. Video recording apparatus comprising:
an input for a video signal with accompanying audio soundtrack;
means for detecting scene changes in the video signal received via the input, and including:
filtering means to receive and filter the audio soundtrack for periodically determining a current background audio signal level;
first storage means for maintaining a record of the last determined background audio signal level; and
comparator means for flagging a scene change when the current background level differs from the stored last background level by more than a predetermined amount;
means for identifying individual frames in the video signal for flagging those frames that meet a predetermined criteria relative to detected discontinuities in the audio background level as scene change frames; and
recording means for recording received audio and video signals on a removable record carrier.

6. The apparatus as claimed in claim 5 further comprising means for identifying individual frames in the video signal and flagging those frames that meet a predetermined criteria relative to detected discontinuities in the audio background level as scene change frames.

7. The apparatus as claimed in claim 6, wherein the video data includes data encoded according to MPEG standards and the predetermined criteria includes that a scene change frame is the first I-frame detected following a discontinuity in audio background level.

8. Video recording apparatus comprising:
an input for a video signal with accompanying audio soundtrack;
means for detecting scene changes in the video signal received via the input, and including:
filtering means to receive and filter the audio soundtrack for periodically determining a current background audio signal level;
first storage means for maintaining a record of the last determined background level and to maintain a record of the last N determined background levels, where N is a value of two or more;
averaging means coupled with the first storage means for generating an average background audio signal level from the last N determined background levels;
comparator means arranged to flag a scene change when the current background level differs from the determined average background level by more than the predetermined amount;
means for operating individual frames in the video signal for flagging those frames that meet a predetermined criteria relative to detected discontinuities in the audio background level as scene change frames; and
recording means for recording received audio and video signals on a removable record carrier.

9. A method for detecting video scene changes in a video signal with accompanying audio soundtrack, the method comprising the steps of:
periodically filtering the audio soundtrack for determining a current background audio signal level;
maintaining a record of the last determined background audio signal level;
comparing current and last determined background audio signal levels to identify discontinuities in background level; and
flagging, as the first frame of a new video scene, a video signal frame commencing at or shortly after the background audio discontinuity.

10. Apparatus for programming a programmable computer system, comprising:
filtering means for providing programmed apparatus for periodically filtering the audio soundtrack for determining a current background audio signal level;
storage means for providing programmed apparatus for maintaining a record of the last determined background audio signal level;
comparing means for providing programmed apparatus for comparing current and previously recorded background audio signal levels to identify discontinuities in background level; and
flagging means for providing programmed apparatus for flagging, as the first frame of a new video scene, a video signal frame commencing at or shortly after the background audio discontinuity.

11. Video scene change detection apparatus comprising:
an input for a video signal with accompanying audio soundtrack;
means for detecting scene changes in the video signal received via the input, including fade break and non-fade break scene changes and including:
a filtering arrangement coupled to receive and filter the audio soundtrack to periodically determine a background audio signal level; and
comparator means for flagging a scene change when the current background level differs from a reference background level.

* * * * *